United States Patent [19]

Timuska

[11] Patent Number: 5,310,320

[45] Date of Patent: May 10, 1994

[54] ROTOR FOR A ROTARY SCREW MACHINE HAVING INTERNAL MEMBER AND EXTERNAL SHELL MADE OF PRESSED METAL POWDER

[75] Inventor: Karlis Timuska, Spanga, Sweden

[73] Assignee: Svenska Rotor Maskiner AB, Stockholm, Sweden

[21] Appl. No.: 960,546

[22] Filed: Oct. 13, 1992

[30] Foreign Application Priority Data

Apr. 27, 1990 [SE] Sweden .............. 9001530-6

[51] Int. Cl.$^5$ ............................... F04C 15/00
[52] U.S. Cl. .......................... 416/241 R; 416/241 A; 418/152; 418/179; 29/888.023; 29/DIG. 31
[58] Field of Search .......... 416/241 R, 241 A; 418/152, 179; 29/888.023, DIG. 31

[56] References Cited

U.S. PATENT DOCUMENTS

| 2,714,314 | 8/1955 | Ulander . | |
|---|---|---|---|
| 3,506,383 | 4/1970 | Ewalt . | |
| 3,591,337 | 7/1971 | Lambey . | |
| 3,918,838 | 11/1975 | Moody, Jr. et al. . | |
| 4,570,316 | 2/1986 | Sakamake et al. | 418/179 |
| 4,846,642 | 7/1989 | Nuber et al. | 418/179 |
| 4,859,164 | 8/1989 | Shimomura | 418/179 |

FOREIGN PATENT DOCUMENTS

| 2133724 | 1/1973 | Fed. Rep. of Germany . |
|---|---|---|
| 2349776 | 5/1974 | Fed. Rep. of Germany . |
| 2364727 | 7/1975 | Fed. Rep. of Germany . |
| 2409554 | 9/1975 | Fed. Rep. of Germany . |
| 3124247 | 6/1983 | Fed. Rep. of Germany . |
| 3424148 | 1/1986 | Fed. Rep. of Germany . |
| 3723998 | 2/1989 | Fed. Rep. of Germany . |
| 58-160585 | 9/1983 | Japan . |
| 303108 | 8/1968 | Sweden . |
| 1433132 | 4/1976 | United Kingdom . |
| 1470584 | 4/1977 | United Kingdom . |
| WO86/05555 | 9/1986 | World Int. Prop. O. . |

OTHER PUBLICATIONS

Smith, *Principles of Materials Science and Engineering*, 1986, pp. 548–550 & 450–455.

*Primary Examiner*—Edward K. Look
*Assistant Examiner*—Michael S. Lee
*Attorney, Agent, or Firm*—Frishauf, Holtz, Goodman & Woodward

[57] ABSTRACT

A rotor for a rotary screw machine has helical lobes (12) and grooves (14). A shell structure (18) forming the external surface of the rotor is made of pressed metal power. The rotor is manufactured by cold isostatic pressing of a powder in a vessel having a surface shaping rotor. The pressure is applied radially by means of a cast bag in which high pressure liquids acts. After the pressing process, the rotor blank is sintered and attached to a shaft (16).

16 Claims, 2 Drawing Sheets

ROTOR FOR A ROTARY SCREW MACHINE HAVING INTERNAL MEMBER AND EXTERNAL SHELL MADE OF PRESSED METAL POWDER

ROTOR FOR A ROTARY SCREW MACHINE

This application is continuation-in-part of International Application PCT/SE91/0300 filed Apr. 26, 1991 (Chapter II).

FIELD OF THE INVENTION

The present invention relates to a rotor for a rotary screw machine with helical lobes and intermediate grooves on the external peripheral surface of the rotor. The invention also relates to a rotary screw machine which is provided with at least one such rotor. Also disclosed is a process for manufacturing such a rotor.

BACKGROUND OF THE INVENTION

Common types of such machines operating as compressors contain a pair of rotors of the kind mentioned above running in a working space formed by a surrounding casing. The casing has a shape of two intersecting cylinders, each cylinder housing one of the rotors. Through the helical lobes and grooves, the rotors intermesh, forming chevron-shaped working chambers between themselves and the surrounding casing, in which working chambers a gaseous fluid is transported and compressed. One of the rotors is a male rotor, having the major part of each lobe located outside its pitch circle and the other rotor is a female rotor, having the major part of each lobe located inside its pitch circle.

A screw rotor of this kind is a complicated element, in particular concerning its geometry. In a transverse section through a rotor, each flank of each lobe follows a curve which usually is of complex structure and has to cooperate with a corresponding complex curve on a lobe of the other rotor. In many cases, the lobes are unsymmetrical so that the two flanks of a lobe are different. Since the lobes are helically extending along the rotor, the angular position of a transverse section through the rotor varies if the location of the section is moved axially along the rotor. The rotors intermesh along their entire axial extension, whereby the sealing lines forming the working chambers each receives a complicated three-dimensional configuration. For attaining an optimal shape of the rotor profiles, considerations have to be made concerning clearances, leakage, efficiency, capacity, noise, vibrations and manufacturing aspects. Due to the complex geometrical structure of the rotors, the different requirements they must meet and the high accuracy that is necessary, the costs for their manufacture are considerable.

According to the conventional technique, a rotor is machined from cylindrical steel blanks in a plurality of passes. This process is time-consuming and results in waste of material.

In the field of screw rotor technology, there have been continuous efforts to attain rotors which are more economical to manufacture. This has resulted in many solutions using different manufacturing techniques and different materials including composite rotors. Examples of rotors made by less conventional manufacturing techniques and/or other materials and material combinations can be found in the following patent documents:

U.S. Pat. No. 3,918,838, which discloses a rotor in which a plastic is molded on a metal skeleton, West German DE 2 409 554, which discloses a rotor made by glass fiber-reinforced plastic on a steel shaft, West German DE 3 424 148, which discloses an injection-molded polymer rotor, West German 2 364 727, which discloses a rotor built by a plurality of plates, International Publication No. WO 86/05555, which discloses a plastic rotor, U.S. Pat. No. 2,714,314, which discloses a rotor made as a welded construction, British Patent Specification No. 1,433,132, which discloses manufacturing of a rotor by extruding, and West German DE 3 124 247, which discloses a ceramic rotor made of silicon nitride.

The objects of the present invention are to achieve a rotor which can be more economically manufactured than by the conventional technique, and to develop a process for manufacturing such a rotor.

SUMMARY OF THE INVENTION

According to the present invention, a rotor of the kind in question includes an external shell made of pressed metal powder of substantially uniform thickness forming the peripheral surface of the rotor. A method of manufacturing the rotor includes manufacturing the shell by cold isostatic form pressing in a die having an internal shape substantially corresponding to the external shape of the finished rotor, and pressing by a pressing tool located within the die, which pressing tool has a shape corresponding to the shape of the die but with smaller radial dimensions so that a gap of substantially uniform thickness is formed between said die and said pressing tool, in which gap said shell is formed. Said shell is sintered and is attached to a shaft.

Although manufacturing articles by compacting metal powder under pressure has been used for several decades, there have been no earlier attempts to manufacture screw rotors or important parts thereof by this technique of the present invention.

Examples of manufacturing articles of complicated shape by cold isostatic form pressing are disclosed in the following patent documents: SE 303 108, U.S. Pat. No. 3,506,383, DE 2 349 776 and GB 1 470 584.

Using the powder pressing technique for manufacturing the outer layer of a screw rotor results in cost reduction as compared with conventional techniques, since only one or even no machining pass will be required for achieving the finished rotor profile, whereas at least two or three machining passes are required for conventionally manufactured rotors, and since the amount of material used will be much lower.

A rotor having an external shell made of pressed metal powder also has the advantage that the material for the shell can be composed, by mixing suitable powder qualities, for different application areas of the machine. As an example, the rotor can be given self-lubricating properties, and the addition of the lubricating compounds will be integrated in the basic production process without any additional cost.

In an advantageous embodiment of the present invention, the shell is attached to a shaft along the helical lines formed by the internal surface of the shell at the bottom of the grooves. This leaves a large part of the rotor with hollows, and the rotor therefore will have a low weight and a low moment of inertia.

Alternatively, the interspace (hollows) between the shell and the shaft can be filled with a polymer, through which they are connected to each other. The polymer should have a coefficient of elasticity lower than that of the shell. This helps prevent the shell from loosening from the polymer due to the applied centrifugal forces.

For the manufacture of a rotor having a shell structure made of pressed metal powder an advantageous embodiment of the process of the present invention includes-attaching the shell to the shaft along the helical lines which are formed at the inside of the groove bottoms.

DETAILED DESCRIPTION

Figure 1:
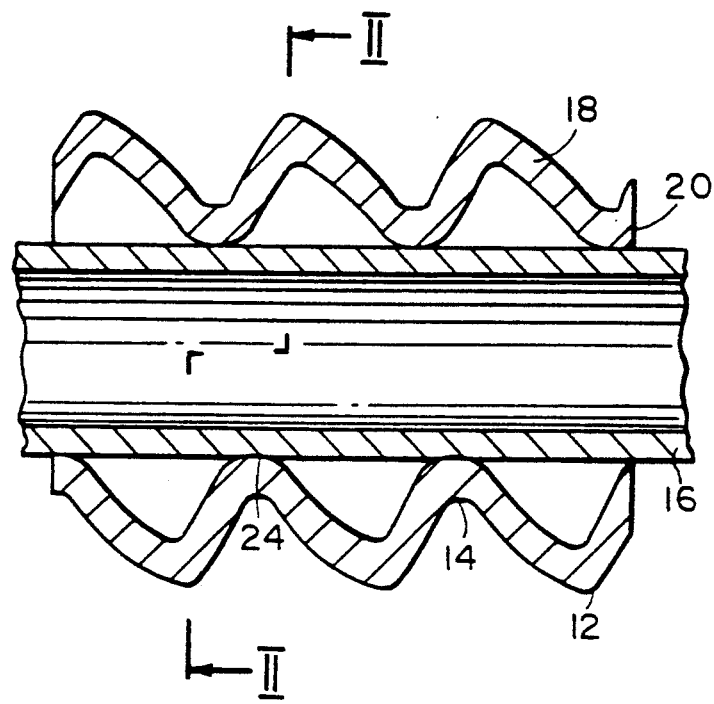
FIG. 1 is a longitudinal section through a rotor according to the invention.
Figure 2:
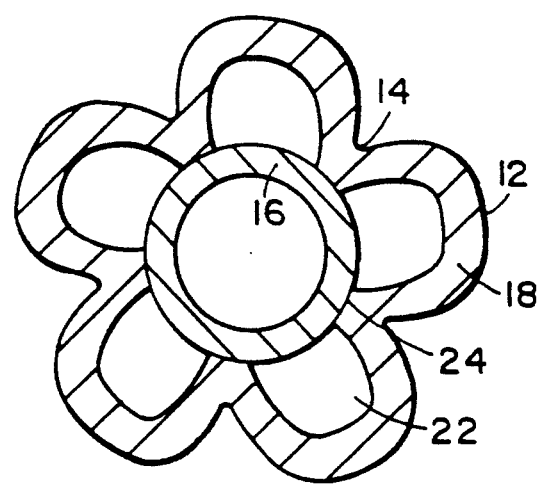
FIG. 2 is a section along line II—II of FIG. 1.

The rotor shown in FIGS. 1 and 2 is a male rotor of a rotary screw compressor. The rotor has five lobes 12 extending helically along the rotor and intermediate grooves 14. The rotor comprises a shell structure 25 mounted on a hollow steel shaft 16. One part 18 of the shell structure forms the external peripheral surface of the rotor and a second part 20 of the shell structure forms the high pressure end surface of the rotor. The other end of the rotor is open, allowing the incoming air to reach the hollows in the rotor. The shaft 16 is attached to the shell structure 18, 20 at the inner side of each groove bottom 24. The shell structure 18, 20 is made of pressed metal powder. The major part of the powder is Fe-based powder, e.g., Fe-powder containing 0.25-0.6 weight % C with the balance being Fe. The powder also contains ingredients giving the surface of the shell structure 18, 20 self-lubricating properties. The shell structure is secured to the shaft during a sintering process.

Figure 3:
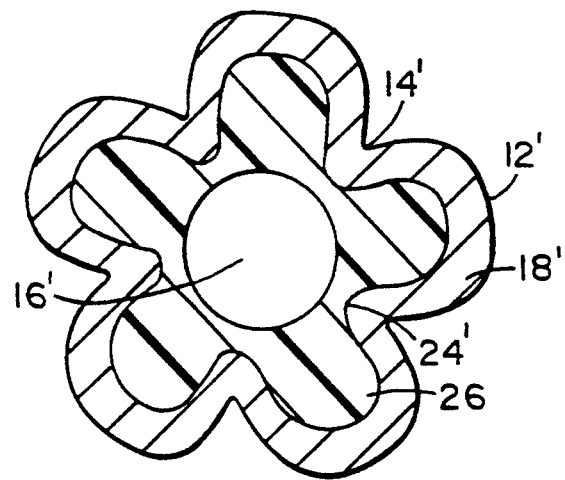
FIG. 3 is a section similar to that of FIG. 2, but showing a second embodiment of the invention.

The hollows in the shell structure can alternatively be filled. This is shown in the embodiment of FIG. 3. The interspace between the shell 18' and the shaft 16', which interspace includes the hollows in the lobes, is filled with a polymer forming a rotor body 26. This filling material forms the connection for the attachment of the shell 18' to the shaft 16', so that it is not necessary that the inside of the groove bottoms contact the shaft 16'. The polymer has a coefficient of elasticity which is lower than that of the shell. A suitable polymer is polyurethane reinforced with glass fibers.

Figure 4:
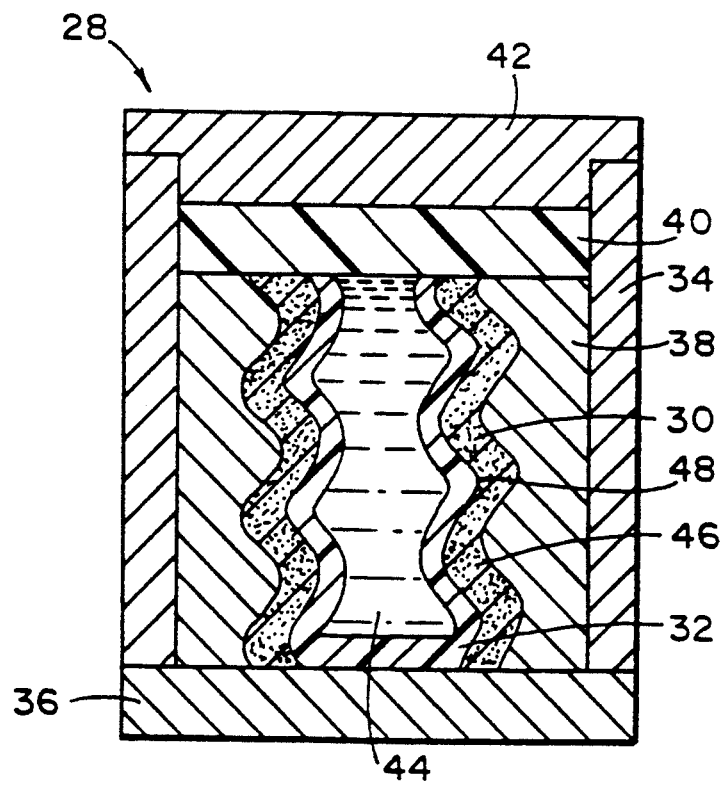
FIG. 4 schematically illustrates the compacting step in the manufacture of a rotor according to the present invention.

The shell structure of the rotors of FIGS. 1-3 is made by pressed metal powder being compacted in a so-called isostatic pressing process. FIG. 4 schematically illustrates this process when used for manufacturing a rotor according to the invention.

The metal powder 30 to be compacted is filled into a vessel 28 including a frame 34, 36 and a die or forming tool 38. The die or forming tool 38 is internally shaped so as to correspond to the shape of the finished rotor. A pressing tool in the form of a flexible cast bag 32 made of silicon/urethane and containing a liquid 44, is located centrally in the vessel 38. The external surface 48 of the cast bag 32 has a shape corresponding to the shape of the finished rotor, but has smaller radial dimensions. The die 38 and the cast bag 32 are positioned in such a way that their profiles are aligned, and a gap is formed between them. Said gap is of substantially uniform thickness, and is filled up by the metal powder 30. The liquid 44 in the cast bag 32 is connectable to a pressure source (not shown).

After filling the gap with the powder 30, the cast bag 32 is closed by a cover 40, and a closure part 42 of the frame is secured to the cylindrical wall 34 thereof. Thereafter the cavity containing the liquid 44 is brought into communication with the pressure source so that the liquid 44 will be under pressure. This pressure is very high, normally in the range of 200 to 500 MPa. Due to the pressure in the cast bag 32 exerted by the liquid 44, the cast bag 32 will expand radially and compact the powder 30 to a shell structure in the gap between the cast bag 32 and the die 38. The compaction reduces the gap to about 80% of its initial thickness; there is no reduction in the axial dimensions.

After finishing the compaction, the closure 42 and the cover 40 are removed and the pressed shell structure can be taken out from the die. The pressed shell structure is then sintered to form a rotor blank. Before sintering, the shell structure of the rotor blank is placed on a shaft contacting the shell structure at the internal side of the groove bottoms. During the sintering, the shell structure then will adhere to the shaft along the contact lines therebetween. This connection will be sufficient to transmit the torque when the rotor is in operation.

In an alternative embodiment, the shell structure is sintered before attachment to the shaft. In the sintered shell structure, the shaft is inserted centrally without contacting the shell structure. A polymer is injected into the interspace between the shell structure and the shaft so that these parts are molded together as the polymer is solidified. The polymer is selected to have a coefficient of elasticity lower than that of the shell structure.

I claim:

1. A rotor for a rotary screw machine, the rotor having an external peripheral surface having helical lobes 912) and intermediate grooves (14) thereon, the rotor further comprising:
    an internal member; and
    an external shell (18) connected to and surrounding said internal member, said external shell being made of pressed metal powder of substantially uniform thickness and forming said external peripheral surface of said rotor.

2. The rotor of claim 1, wherein said internal member includes:
    a shaft (16'); and
    a rotor body (26) arranged between said shaft (16) and said shell (18');
    said rotor body (26) being made of material having a lower coefficient of elasticity than said shell (18').

3. A rotary screw machine provided with at least one rotor according to claim 1.

4. The rotor of claim 1, wherein said metal powder is Fe-powder containing from 0.25 wt. % to 0.6 wt. % C, with the balance being Fe.

5. The rotor of claim 1, wherein:
    said internal member includes a shaft (16); and
    said shaft (16) and said shell (18) contact each other along helical lines (24) formed by internal surfaces of said shell (18) at bottoms of said grooves (14), whereby said shell (18) is attached to said shaft (16) along said helical lines (24).

6. A rotary screw machine provided with at least one rotor according to claim 5.

7. The rotor of claim 1, wherein said shaft (16) is a hollow shaft.

8. A rotary screw machine provided with at least one rotor according to claim 7.

9. The rotor of claim 2, wherein said rotor body (26) is connected to said shaft (16').

10. The rotor of claim 2, wherein said shell (18') is filled with said rotor body (26).

11. A rotary screw machine provided with at least one rotor according to claim 10.

12. The rotor of claim 2, wherein said material of said rotor body (26) is a polymer.

13. A rotary screw machine provided with at least one rotor according to claim 12.

14. A rotary screw machine provided with at least one rotor according to claim 2.

15. The rotor of claim 2, wherein said rotor body (26) is made of polyurethane reinforced with glass fibers.

16. The rotor of claim 15, wherein said metal powder is Fe-powder containing from 0.25 wt. % to 0.6 wt. % C, with the balance being Fe.

* * * * *